July 10, 1945.    C. I. BAKER    2,379,869
DIRECTIONAL COMPASS FOR AIRCRAFT TRAINERS
Filed Aug. 6, 1943
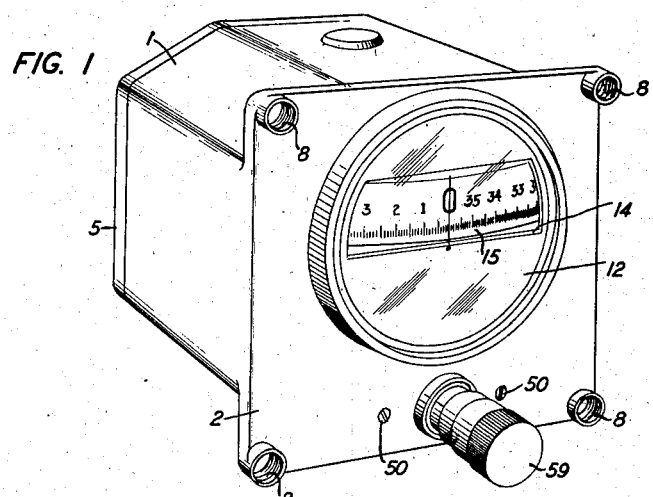
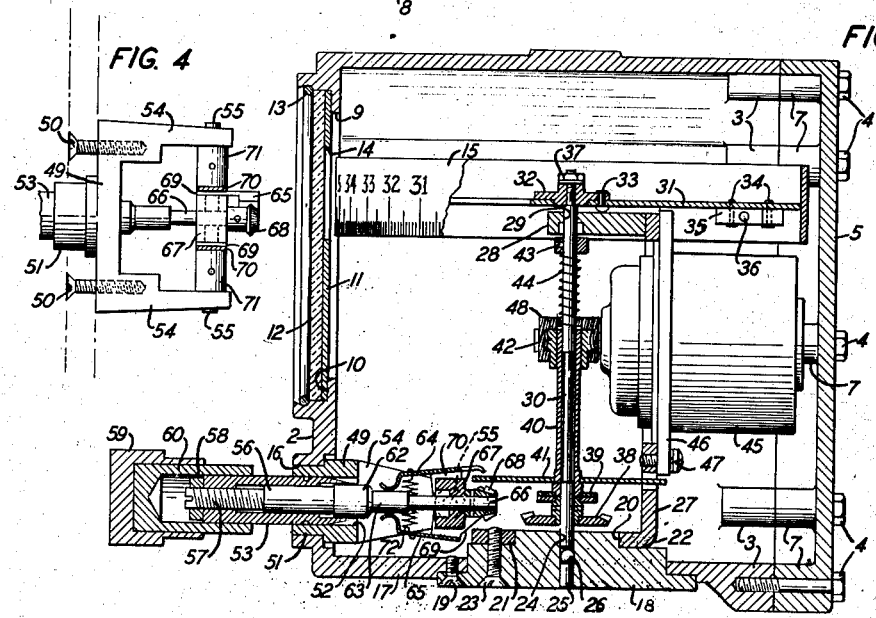
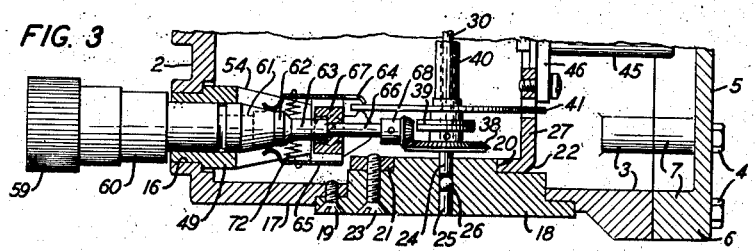
INVENTOR
C. I. BAKER
BY P. C. Smith
ATTORNEY Patented July 10, 1945

2,379,869

UNITED STATES PATENT OFFICE 2,379,869

DIRECTIONAL COMPASS FOR AIRCRAFT TRAINERS

Clarence I. Baker, Elizabeth, N. J., assignor to Bell Telephone Laboratories, Incorporated, New York, N. Y., a corporation of New York Application August 6, 1943, Serial No. 497,599

4 Claims. (Cl. 177—327)

This invention relates to a directional compass for use in an aircraft trainer.

For the purpose of giving pilots training in the flying of an aircraft by the observation of the flight instruments, trainers have been developed for giving ground training to pilots. Such trainers do not leave the ground but are provided with the elevator, rudder and aileron controls which are found in an actual aircraft and with instruments corresponding to the flight instruments of an actual aircraft. These instruments are arranged to respond to the operation of the controls by a pilot under training so that by observing the instruments the pilot is given the sensation of actual flight.

An actual aircraft is provided with a magnetic compass or a compass which is controlled to indicate the compass heading of the flight course. The magnetic compass has a tendency to swing first one way and then the other due to the quick movement of the aircraft in rough weather or in executing maneuvers and therefore a directional gyroscopically controlled compass is provided to meet the need of a steady compass card. The compass card of the directional compass is set to agree with the magnetic compass when the pilot is flying a straight course and the magnetic compass is fairly steady and after being thus set the gyroscope functions to hold the card in its set position even though the aircraft may turn quickly one way or the other. However, it is necessary for the pilot to reset the directional compass to agree with the magnetic compass about every fifteen minutes due to the fact that the compass being gyroscopically controlled is affected by the rotation of the earth.

In order that the functions of the magnetic and directional gyro compasses may be simulated, the trainer may be equipped with compasses the compass cards of which may be oriented in response to the operation of the controls of the trainer in simulation of turning movements. In order that the compass card of the instrument which simulates the directional gyro compass may be progressively varied with respect to the movement of the compass card of the instrument which simulates the magnetic compass to simulate the divergence in compass readings which would occur between the magnetic and directional gyro compasses of an actual aircraft, the compass card of the directional gyro instrument of the trainer is driven at a slightly different speed than the compass card of the magnetic compass of the trainer so that it becomes necessary for the pilot under training to reset the directional gyro compass about once in fifteen minutes to cause it to agree with the magnetic compass as he would be required to do in an actual aircraft.

The object of the invention is to provide a directional compass of simple construction which may be operated in an aircraft trainer in simulation of the operation of the usual gyroscope controlled directional compass of an aircraft while in flight.

To attain this object the drum-shaped compass card customarily employed in the usual directional compass is secured to the upper end of a shaft journaled for free rotation within the compass casing. The shaft is surrounded by a sleeve connected thereto by friction discs, which sleeve has secured thereto a worm gear driven by a worm on the shaft of a motor of the self-synchronizing type. Secured to the lower end of the shaft is a bevel gear for engagement with a setting gear on the spindle of a rotatable and longitudinally movable caging knob when the knob is pressed inwardly. The sleeve also has a brake or caging disc secured near its lower end with which pivoted brake shoes cooperate. The spindle of the caging knob is provided with a cam surface for operating the brake shoes into engagement with the caging disc when the caging knob is pressed inwardly to engage the setting gear with the bevel gear whereby the motor is held from driving the sleeve and from driving the compass card shaft while the shaft is being turned by the caging knob to correct the position of the compass card.

For a clearer understanding of the invention reference may be had to the following detailed description taken in connection with the accompanying drawing in which:

Fig. 1 is an isometric exterior view of a directional compass;

Fig. 2 is a vertical view partly in cross-section of the compass of Fig. 1;

Fig. 3 is a sectional view similar to the lower portion of Fig. 2 but showing the caging knob in its operated position; and Fig. 4 is a detail top view of a portion of the caging knob assembly.

The compass casing 1 is substantially octagonal in shape, the forward edges of its eight side walls being integrally joined with the front end wall 2 of substantially rectangular shape. The side walls are formed adjacent to their rear edges with embossment 3 having threaded holes therein for receiving the threaded shanks of lag screws 4 which serve to clamp the rear cover 5 of the casing to the side walls of the casing. The inner flanged wall 6 of the cover is also provided with embossments 7 through holes in which the lag screws 4 extend.

The forward wall 2 of the casing is provided with threaded holes 8 extending through embossments located at the four corners of the wall into which screws for securing the compass to the instrument panel of the trainer may be threaded. The wall 2 is also provided with a large circular opening 9 therethrough provided with a shoulder portion 10 on which are seated a mask 11 and a glass panel 12. The mask and panel are retained in position by a spring retaining ring 13. The mask has a substantially rectangular opening 14 therein through which and the overlying glass plate 12 the compass card 15 may be viewed. Beneath the opening 9 and with its center vertically aligned with the center of the opening 9 is a circular hole 16 in which the caging knob assembly is mounted.

The bottom wall 17 of the casing 1 is provided with a circular opening in which a circular closure disc 18 is secured by screws such as 19. This disc is provided with a circular shoulder 20 on its inner face upon which is seated the horizontally extending arm 21 of an L-shaped bracket 22. The arm 21 of the bracket is provided with a circular opening therethrough which embraces the shouldered portion 20 of the disc 18 and is secured to the disc by screws such as 23. The disc 18 has an axial hole 24 therethrough the lower end of which is closed by a plug 25. A steel bearing ball 26 is positioned in the axial hole and is supported on the upper end of the plug 25.

The vertically extending arm 27 of the bracket 22 has a bearing member 28 secured in any suitable manner to its upper end. Such bearing member has a hole 29 therein vertically aligned over the hole 24 of the disc 18. Journaled in the holes 24 and 29 and with its lower end resting on the bearing ball 26 is a vertical shaft 30 upon the upper end of which and above the bearing member 28 is secured a compass card supporting spider 31.

The spider 31 has a central hole therethrough in which is positioned a hub member 32 bracing the reduced end of shaft 30 and secured to the spider by the rivets 33. Secured to the ends of the spider arms as by rivets 34 are blocks 35 to which the drum-shaped compass card 15 is secured by screws such as 36. The compass card assembly is secured to the upper end of the shaft 30 so that it is rotatable by the shaft, by the clamping nut 37 threaded upon the reduced end of the shaft. The compass card is so positioned that it is visible through the opening 14 in the mask 11.

Secured to the shaft 30 adjacent to the lower end thereof is a bevel gear 38 to the upper end of the hub of which is secured one disc of a friction clutch 39. The clutch disc may, for example, be secured to the hub of gear 38 by swaging. Surrounding the shaft 30 and extending upwardly from the hub of gear 38 is a sleeve 40 which is provided with an enlarged lower end serving as a hub portion for supporting the other disc of the friction clutch 39 and a caging or brake disc 41. These discs may both be swaged upon the hub portion, the clutch disc being positioned on the extreme lower end of the hub portion so that it may frictionally engage the clutch disc carried by the hub of gear 38.

Secured by a set screw to the upper end of the sleeve 40 is a worm gear 42. Secured by a set screw to the shaft 30 immediately below the bearing member 28 is a collar 43 and positioned between the upper end of the hub of gear 42 and the collar 43 and surrounding the shaft 30 is a coiled spring 44 which serves to hold the discs of clutch 39 in frictional engagement.

A motor 45 having a mounting plate 46 is secured by lag screws 47 to the vertically extending arm 27 of the bracket 22, the bracket arm having a circular opening therein through which one end of the motor casing extends. The shaft of the motor has a worm 48 secured to the inner end thereof which worm meshes with the worm wheel 42 whereby the motor is enabled to drive the sleeve 40 and through the friction clutch 39 to drive the shaft 30 and the compass card assembly carried thereby. The motor 45 may be of the synchronous type electrically coupled with a synchrogenerator. The synchrogenerator may be driven by a motor controlled in response to the operation of the controls of the trainer for executing a simulated turning movement.

Seated in the opening 16 in the front wall 2 of the casing 1 is a caging knob assembly. The supporting frame 49 of this assembly is positioned immediately back of the front wall 2 of the casing 1 and is secured near its ends to the casing by screws 50. The central portion of the frame has a collared portion 51 which engages in the opening 16 of the wall 2 and through which a hole 52 is drilled which serves as a guide for the sleeve 53 of the caging knob. Each end of the frame 49 has an inwardly extending post portion 54 formed integrally therewith which post portions serve as bearing members for journaling the outer ends of the shafts 55 as best disclosed in Fig. 4.

Extending through the sleeve 53 and closely fitting the bore of the sleeve is a spindle 56. The outer end 57 of the spindle is reduced in diameter and is threaded through a threaded portion of the outer end of the sleeve. The outer threaded end 57 of the spindle is provided with a saw kerf to receive a screw-driver blade whereby the spindle may be turned with respect to the sleeve and through its threaded engagement with the sleeve the spindle may be moved longitudinally with respect to the sleeve for a purpose to be later described. For locking the spindle in any adjusted position, a lock nut 58 is threaded upon the threaded portion 57 of the spindle for engagement against the outer end of the sleeve. Secured to the outer end of the sleeve 53 in any suitable manner is a caging knob 59. This knob 59 is preferably molded upon a metal thimble 60 which embraces the end of sleeve 53 and which provides a suitable means for securing the knob to the sleeve 53.

The inner end of the sleeve 53 is tapered as shown at 61 and cooperates with a portion 62 of the spindle 56 to form a cam. The spindle 56 just beyond the portion 62 is reduced in diameter at 63 to provide a stop against which the cam ends of the brake shoes 64 and 65 normally rest. The inner end of the spindle 56 is still further reduced in diameter as at 66, extends through a hole in bearing block 67 and has secured to the inner end thereof a bevel pinion 68 meshable with the bevel gear 38. The bearing block 67 is supported on the reduced portion 66 of the spindle and serves to journal the inner ends of shafts 55 as best disclosed in Fig. 4.

The lower brake shoe 65 is provided with two parallelly disposed upwardly turned ears 69 having aligned holes therein through which the shafts 55 extend and upon which shafts the brake shoe is pivotally supported. These ears are spaced to lie adjacent to the opposite ends of the block 67. One of these ears is extended forwardly and upwardly to normally lie just beneath the outer edge of the brake disc 41. The upper brake shoe 64 is similarly provided with two parallelly disposed downwardly turned ears 70 having aligned holes therein through which the shafts 55 extend and upon which shafts the brake shoe is pivotally supported. These ears are spaced to lie just outside the ears 69 of the lower brake shoe and adjacent thereto. The brake shoe 64 normally overlies the outer edge of the brake disc 41 but out of engagement therewith.

Disposed on the shafts 55 between the outer faces of the ears 70 of brake shoe 64 and the inner faces of the posts 54 of the frame 49 are spacers 71. These spacers are riveted to the shafts 55 and thus serve to prevent axial movement of such shafts.

Each of the brake shoes 64 and 65 is bent at its outer end to form a cam surface for cooperation with the cam formed jointly by the portion 62 of the spindle 56 and the inner tapered end 61 of the sleeve 53. Normally these cam surfaces of the shoes are held against the stop portion 63 of the spindle 56 by a coiled spring 72 which has its ends secured to the forwardly extending portions of the brake shoes as disclosed in Fig. 2. With the brake shoes thus normally positioned their inner ends are out of engagement with the brake disc 41 and the motor 45 is thus free to rotate the compass card 15. Since the shaft 30 is supported on the bearing ball 26, the shaft and compass card are easily rotated by the motor 45 without placing any appreciable load upon the motor.

When it becomes necessary to correct the reading of the compass, the caging knob 59 is pushed in to the position disclosed in Fig. 3 and is then rotated. When the knob is pushed in the cam surface formed by the portion 62 of the spindle and by the tapered end 61 of the sleeve 53 engages the outer cam ends of the brake shoes 64 and 65, thereby rotating such brake shoes on the shafts 55 as pivots to engage the inner ends of such shoes with the faces of the brake disc 41. This engagement of the brake shoes with the brake disc now serves to prevent the motor 45 from rotating the sleeve 40 and through the frictional engagement between the sleeve and the shaft 30 through the clutch 39 prevents the motor from rotating the compass card. The compass card is thus caged.

As the caging knob 59 is pushed in the bevel pinion 68 secured to the inner end 66 of the spindle 56 is brought into mesh with the bevel gear 38 and when the knob 59 is now turned the the shaft 30 is rotated to rotate the compass card and to thus correct the reading of the compass. The clutch 39 slips to permit the rotation of the compass card even though the sleeve 40 is held against rotation by brake shoes engaging with the brake disc 41.

When the adjustment of the compass has been accomplished the caging knob 59 is again pulled out unmeshing the gears 38 and 68 and permitting the brake shoes 64 and 65 to be disengaged from the brake disc 41 through the action of spring 72. The motor 45 is now free to rotate the compass card as may be required.

The braking force exerted by the brake shoes 64 and 65 may be increased by adjusting the brake shoes. Since it is desirable to engage the brake shoes with the brake disc 41 to cage the compass card before pinion 68 is engaged with the gear 38, the spindle 56 may be turned with respect to the sleeve 53 so that the tapered end 62 of the sleeve will engage the cam ends of the brake shoes to force them apart when the caging knob is pressed inwardly and to thus engage the brake shoes with the disc 41 before the pinion 68 engages the gear 38.

What is claimed is:

1. In a directional compass for an aircraft trainer, a bracket, a vertical shaft rotatably supported therein, a compass card secured to the upper end of said shaft, a sleeve surrounding said shaft, a friction clutch for coupling said sleeve to said shaft, a worm gear secured to said sleeve, a driving motor supported on said bracket and having a worm on its shaft in mesh with said worm gear, a beveled gear secured to the lower end of said shaft, a caging disc secured to the lower end of said sleeve, and a caging assembly comprising a rotatably and axially movable spindle having a caging knob secured to one end thereof and a cam and setting gear secured to the other end thereof, and pivotally mounted brake shoes operable by said cam to engage said caging disc when said caging knob is moved to engage said setting gear with said beveled gear to adjust the setting of said compass card.

2. In a directional compass for an aircraft trainer, a bracket, a vertical shaft rotatably supported therein, a compass card secured to the upper end of said shaft, a sleeve surrounding said shaft, a first clutch disc secured to the lower end of said sleeve, a beveled gear secured to the lower end of said shaft, a second clutch disc secured to the hub of said gear for frictional engagement with said first clutch disc, a worm gear secured to said sleeve, a driving motor supported on said bracket and having a worm on its shaft in mesh with said worm gear, a caging disc secured to the lower end of said sleeve, and a caging assembly comprising a rotatably and axially movable spindle having a caging knob secured to one end thereof and a cam and setting gear secured to the other end thereof and pivotally mounted brake shoes operable by said cam to engage said caging disc when said caging knob is moved to engage said setting gear with said beveled gear to adjust the setting of said compass card.

3. In a directional compass for an aircraft trainer, a bracket, a vertical shaft rotatably supported therein, a compass card secured to the upper end of said shaft, a sleeve surrounding said shaft, a friction clutch for coupling said sleeve to said shaft, a worm gear secured to said sleeve, a driving motor supported on said bracket and having a worm on its shaft in mesh with said worm gear, a beveled gear secured to the lower end of said shaft, a caging disc secured to the lower end of said sleeve, and a caging assembly comprising a rotatably and axially movable spindle having a caging knob secured to one end thereof and a setting gear secured to the other end thereof, an adjustable sleeve on said spindle for cooperating with a portion of said spindle to form a changeable cam, pivotally mounted brake shoes operable by said cam to engage said caging disc when said caging knob is moved to engage said setting gear with said beveled gear to adjust the setting of said compass card, and means for moving said sleeve with respect to said spindle to change said cam to insure that said brake shoes shall engage said caging disc prior to the engagement of said setting gear with said beveled gear.

4. In a directional compass for an aircraft trainer, a bracket, a vertical shaft rotatably supported therein, a compass card secured to the upper end of said shaft, a friction clutch for coupling said sleeve to said shaft, a worm gear secured to said sleeve, a driving motor supported on said bracket and having a worm on its shaft in mesh with said worm gear, a beveled gear secured to the lower end of said shaft, a caging disc secured to the lower end of said sleeve, and a caging assembly comprising a frame having two parallelly disposed bearing posts, a spindle rotatably and axially movable in said frame having a caging knob secured to one end thereof and a setting gear secured to the other end thereof, a bearing block supported on said spindle, shafts journaled in said posts and in said bearing block, an adjustable cam on said spindle and brake shoes pivotally supported on said shafts having their brake surfaces disposed on opposite faces of said caging disc for engagement therewith and having arms engageable with said cam whereby said brake shoes are operable to engage said caging disc when said caging knob is moved to engage said setting gear with said beveled gear to adjust the setting of said compass card.

CLARENCE I. BAKER.